Aug. 5, 1969    R. E. WALLER    3,459,248
WIRE INSERT

Original Filed April 1, 1966    2 Sheets-Sheet 1

INVENTOR.
RICHARD E WALLER
BY
Woodling, Krost Grangers Rust
Attys.

INVENTOR.
RICHARD E WALLER

United States Patent Office 3,459,248
Patented Aug. 5, 1969

3,459,248
WIRE INSERT
Richard E. Waller, 534 Shenley Drive,
Erie, Pa. 16505
Continuation of application Ser. No. 539,473, Apr. 1, 1966. This application Jan. 11, 1968, Ser. No. 697,132
Int. Cl. F16b *39/30*
U.S. Cl. 151—14      3 Claims

ABSTRACT OF THE DISCLOSURE

A wire insert comprising a wire with a diamond shape wound about an axis in a helical direction on a generally constant diameter to make up a plurality of coils. One end of the insert has a tang extending generally normal to the axis to aid in inserting the insert into an internal screw thread. A plurality of chords are formed of the wire each of which has ends which terminate on a circumference defined by the referred to diameter. The chords adjacent each other are spaced apart an angular distance of at least 180 degrees and no greater than 270 degrees. The ratio of the total number of chords over the total number of locking coils being in the range of 1.2 to 2.5 and more preferably 2.0 to 2.5 and it is also preferred that there be at least three chords.

---

This application is a continuation of United States patent application Ser. No. 539,473 filed Apr. 1, 1966, entitled Wire Insert, now abandoned.

The provision of inserts in general are known in the art, however, the known designs have many deficiencies while still accomplishing a commercial result. Most users of these inserts require that a given insert exert no more than a given maximum torque on a bolt screwed thereinto the first time and no less than some minimum torque after so many cycles or removals of the bolt. If the number of cycles is plotted against the torque exerted on the bolt a curve can be constructed which is commonly referred to in the art as a torque curve. The slope of such a curve is an indication of the decline of torque in assembly and removal of a screw over a given number of cycles. With the present invention it has been possible to design a screw thread insert which obviates many of the problems of the prior art designs and provides an insert which has a relatively flat torque curve particularly when compared with prior art designs. When automatic installing equipment is used to install threaded members into the insert of the present invention a larger advantage is realized in that the torque buildup is much more gradual resulting in less wear on the equipment. The present design also insures that if a threaded member is accidentally put in short it will still, in most cases, engage with at least one locking chord which does not happen in many cases where the insert has all locking chords concentrated at the middle of the insert. An additional advantage of the present design also arises from the fact that the spacing of the chords as herein set forth does not have the effect of wearing plating off the threaded member to the extent of prior designs.

Summary

The invention summarized, may be said to be directed to the appropriate spacing and relationship of locking chords and locking coils. The chords should be spaced between 180 and 270 degrees and the ratio of chords over coils should be between 1.2 and 2.5.

Another object of the present invention is to provide a screw thread insert which has a plurality of locking chords so related to each other and so related to the coils upon which they are located that a substantially flat torque curve results which in turn enables an externally threaded member to be inserted into and removed therefrom a maximum number of times while still meeting the maximum and minimum torque requirements.

Other objects and a fuller understanding of this invention may be had by referring to the following description and claims, taken in conjunction with the accompanying drawings, in which:

Figure 1:
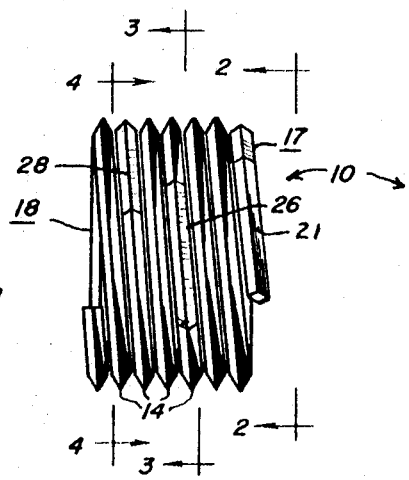
FIGURE 1 is an elevational view of the wire insert of the present invention.
Figure 2:
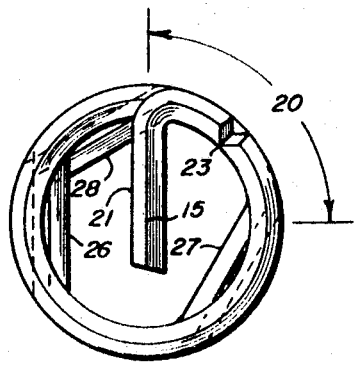
FIGURE 2 is a view taken along the line 2—2 of FIGURE 1.

The screw thread wire insert which is shown in FIGURES 1 through 5 of the drawings has been indicated generally by the reference numeral 10 and is for the purpose of being threadably inserted into the internal screw threads 11 of a member 12. The insert 10 is constructed of wire which is generally diamond shaped in cross section and this wire is wound symmetrically about an axis 15 in a helical direction and on a substantially constant diameter. This makes the wire insert into a generally cylindrical configuration made up of a plurality of coils 14 and the term coil as used herein means a complete turn of wire encompassing substantially 360 degrees. The insert 10 as shown is provided with first and second end portions 17 and 18, respectively.

The first end portion 17 of the insert is provided with a tang 21 which extends off of the end of the last coil and in a direction which is substantially on a diameter of the insert and which also is positioned generally normal to the axis of the insert. The tang 21 is to facilitate insertion of the insert into the internal thread and is the first part which enters the internal thread. This tang 21 is engaged by a tool which is then rotated to install the insert and it will be noted that a cut or notch 23 is provided which is for the purpose of breaking the tang off after it has been completely inserted so that the tang does not interfere with an externally threaded member which later is to be threaded into the insert. The insert in its free condition shown in FIGURE 1 normally has a diameter which is slightly larger than the diameter of the internal thread into which it is to be inserted. The insert has been shown in FIGURE 5 as being of the same diameter merely for more ease in illustration. It will be appreciated in actuality that the diameter of the insert in FIGURE 5 will be slightly smaller and as a result its axial length will be slightly increased.

The locking effect which is created between the insert 10 and an externally threaded member which is threadably received thereinto, is created by a plurality of straight chords formed of the diamond shaped wire and each of the chords has two ends, both of which lie on the circumference defined by the diameter of the insert. These chords are designed to bear upon the external threads of a mating screw, offering a controlled resistance to turning and thereby creating a locking effect. Under the teachings of the present invention there should be at least three chords, which three are shown in FIGURES 1 through 5 and are identified by the reference numerals 26, 27 and 28. In order to realize the advantages of the present invention it is necessary that adjacent ones of the chords be spaced apart an angular distance of at least 180 degrees and no greater an angular distance than 270 degrees. In the present embodiment chords 26 and 27 are located 210 degrees apart and chords 27 and 28 are located 210 degrees apart, this measurement being the angular distance between the mid point of the two chords. In order to facilitate free entrance of the screw without cross threading the first chord should be positioned at least 1½ coils from the end of the insert or 540 degrees. This measurement is started 90 degrees from the diameter on which the tang extends or the distance 20 indicated in FIGURE 2. In measuring the number of free coils in the insert the measurement is taken from the same point.

Another important feature of the present invention and of primary importance is the relationship of the number of locking coils to the number of chords. It has been determined that in order to accomplish the desired results the ratio of the total number of chords over the total number of locking coils should lie in the range of 1.2 to 2.5 and more preferably in the range of 2.0 to 2.5 in order to produce a locking effect on a male threaded member which is threadably received thereinto whereby a good load distribution results over the axial length of the insert. In other words, using the number of chords or flats as the numerator and the number of locking coils as the denominator, the ratio should not fall outside the range of 1.2 to 2.5 and the more preferred range of 2.0 to 2.5. This of course also being utilized in combination with the spacing of the chords of at least 180 degrees and no greater than 270 degrees. When these parameters are followed and utilized a torque curve results which is extremely desirable when compared in the light of prior art devices. The number of locking coils is determined by counting the number of coils starting at the first chord and ending at the last chord.

Figure 5:
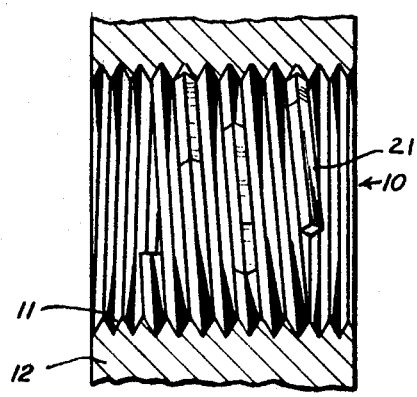
FIGURE 5 is an elevational view partially in section showing the wire insert located in an internally threaded member; and, FIGURE 6 is a typical torque curve of the wire insert shown in FIGURE 1.
Figure 3:
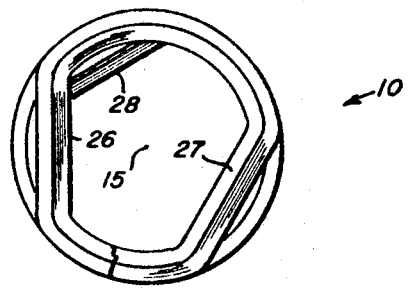
FIGURE 3 is a view taken along the line 3—3 of FIGURE 1.
Figure 4:
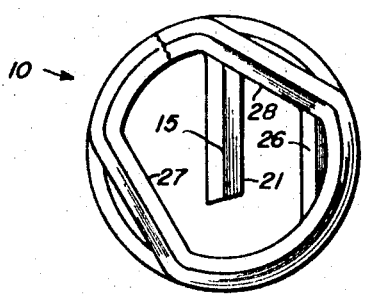
FIGURE 4 is a view taken along the line 4—4 of FIGURE 1.

FIGURE 5 is a torque curve for a wire insert constructed within these guide lines and having a thread size of 8–32 with six free coils and three chords and the spacing between chords being 210 degrees. The free coil diameters were approximately .212 inch and these were between 28 and 34 coils per inch. The curve given in FIGURE 6 resulted from the testing of 70 different inserts of this size and the values used were obtained from a regular test set up for this type of device. In other words, the number of cycles designates the number of insertions and removal of an externally threaded member into a given insert and the designation of inch pounds is the average force encountered during the cycle. It will be seen that the curve is quite flat, and based upon the slope of the curve this particular insert had an estimated life expectancy of on the order of 72 cycles based upon the torque drop between 5 and 15 cycles.

In the use of prior art devices it has not been possible to maintain as flat a curve as with the devices of the present invention and in addition to this the problems inherent in the prior art designs as pointed out in the first part of this specification, are not present in the device of the present invention.

Figure 6:
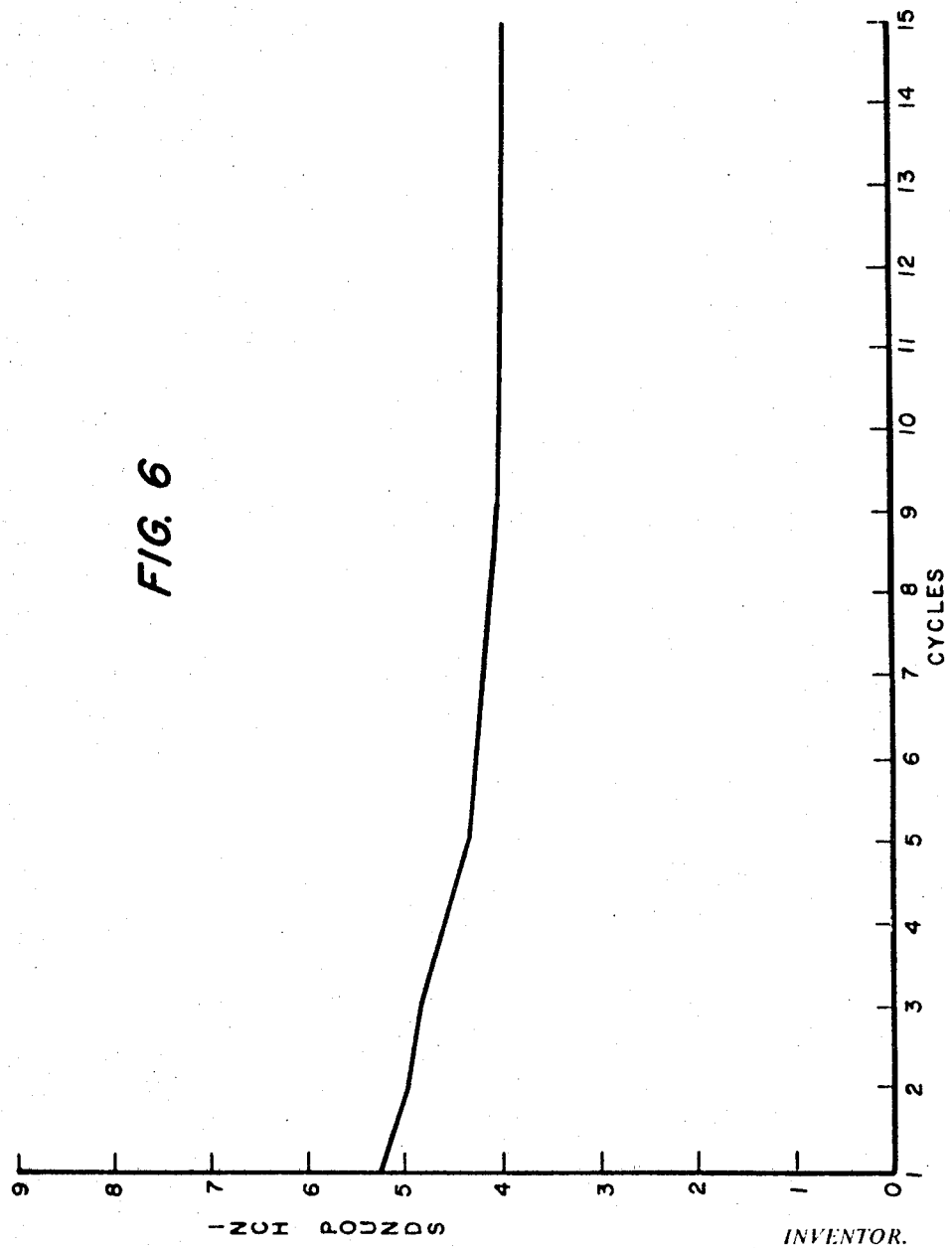

As pointed out in the initial part of this disclosure, the use of wire inserts per se, which utilize a locking chord is not new. However, with the specific relationships between the number of chords and the number of locking coils as well as the spacing between the chords and the position of the first chord from the tang end, it is possible to come up with the device of the present invention which has all of the advantages pointed out, with the primary advantage being evidenced by the comparatively flat torque curve as shown in FIGURE 6.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention.

What is claimed is:

1. A wire insert for insertion into an internal screw thread including in combination a wire having diamond shaped cross section and wound symmetrically about an axis in a helical direction on a substantially constant diameter, to form a cylindrical configuration made up of a plurality of coils of said wire, said insert having first and second portions, said first end portion of said insert having a tang extending generally normal to said axis to facilitate insertion of said insert into an internal screw thread, a plurality of straight chords formed of said wire, each of which has ends which lie on a circumference defined by said diameter, adjacent ones of said chords being spaced apart an angular distance of at least 180 degrees and no greater than 270 degrees, the number of coils between the most axially separated chords being locking coils, and the first chord from said first end portion being spaced an angular distance therefrom of at least 540 degrees, the ratio of the total number of chords over the total number of locking coils being in the range of from 1.2 to 2.5 to produce a locking effect on an externally threaded member which has a good load distribution over the axial length of said insert.

2. A wire insert as claimed in claim 1 wherein there are at least three chords.

3. A wire insert as claimed in claim 2 wherein the ratio of the total number of chords over the total number of locking coils is in the range of from 2.0 to 2.5.

References Cited

UNITED STATES PATENTS 2,607,259   8/1952   Forster.
2,874,741   2/1959   Brancato.

RAMON S. BRITTS, Primary Examiner